United States Patent [19]

Sutch

[11] 3,869,234

[45] Mar. 4, 1975

[54] APPARATUS FOR MOLDING AND MEANS FOR TRANSFERRING A PREFORM FOIL TO THE MOLD

[75] Inventor: Brian Leo Chudleigh Sutch, Great Bookham, England

[73] Assignee: Airfix Industries Limited, London, England

[22] Filed: May 25, 1973

[21] Appl. No.: 364,091

Related U.S. Application Data

[63] Continuation of Ser. No. 160,469, July 7, 1971, abandoned.

[30] Foreign Application Priority Data

July 17, 1970 Great Britain .................... 34930/70
Dec. 9, 1970 Great Britain .................... 58558/70
Dec. 12, 1970 Great Britain ...................... 1460/71

[52] U.S. Cl. .......... 425/112, 425/126 R, 425/129 R
[51] Int. Cl. ............................................. B29d 3/00
[58] Field of Search .......... 425/126, 129, 112, 388; 156/566–571, 540; 271/90, 95, 107; 214/1 BH, 1 BV

[56] References Cited
UNITED STATES PATENTS 3,367,822  2/1968  Hoffler ................................ 156/571
3,513,505  5/1970  Brown et al. ....................... 425/388
3,623,720  11/1971  Vite et al. ............................. 271/95

Primary Examiner—Andrew R. Juhasz
Assistant Examiner—David B. Smith
Attorney, Agent, or Firm—Scrivener Parker Scrivener and Clarke

[57] ABSTRACT

A foil transfer mechanism comprises a carriage movable between foil pick-up and deposition stations, a carrier including a body having an axis of symmetry about which the carrier is angularly movably mounted on the carriage and a foil feeding vacuum plate at the pick-up station for feeding a foil from a magazine to a foil receiving circumferential surface of the carrier tangentially thereof to be wrapped therearound on rotation of the carrier. The mechanism is particularly adapted for use in an injection moulding machine for loading foils into the female cavity on one tool thereof, the one tool comprising two parts each of which defines a moulding cavity with the male tool, each part being movable out of the moulding station for loading with a foil.

10 Claims, 9 Drawing Figures

APPARATUS FOR MOLDING AND MEANS FOR TRANSFERRING A PREFORM FOIL TO THE MOLD

This is a continuation of application Ser. No. 160,469 filed July 7, 1971, now abandoned.

This invention is concerned with improvements in and relating to the art of moulding.

According to the present invention there is provided a foil transfer mechanism for a moulding machine including a carriage movable between first and second stations, a foil carrier rotatably mounted on the carriage, the foil carrier including a body having an axis of symmetry about which the carrier is rotatable and defining a circumferential surface for receiving a foil and port means in the circumferential surface for connection to a source of operating fluid, drive means for moving the carriage and for rotating the carrier and means for positioning a foil tangentially of the circumferential surface of the carrier when in the first station, whereby in operation with the carriage at the first station a foil positioned tangentially of the carrier surface will be progressively applied to the surface by rotation of the carrier and application of subatmospheric pressure fluid at the ports and with the carriage at the second station a foil on the carrier may be released therefrom.

Such a transfer mechanism is capable of handling decorative foil or structural foil which will extend partly or wholly around a moulded product.

Further features and advantages of this invention will appear from the following description of an embodiment thereof, given by way of example only, reference being had to the accompanying drawings, in which.

Figure 2:
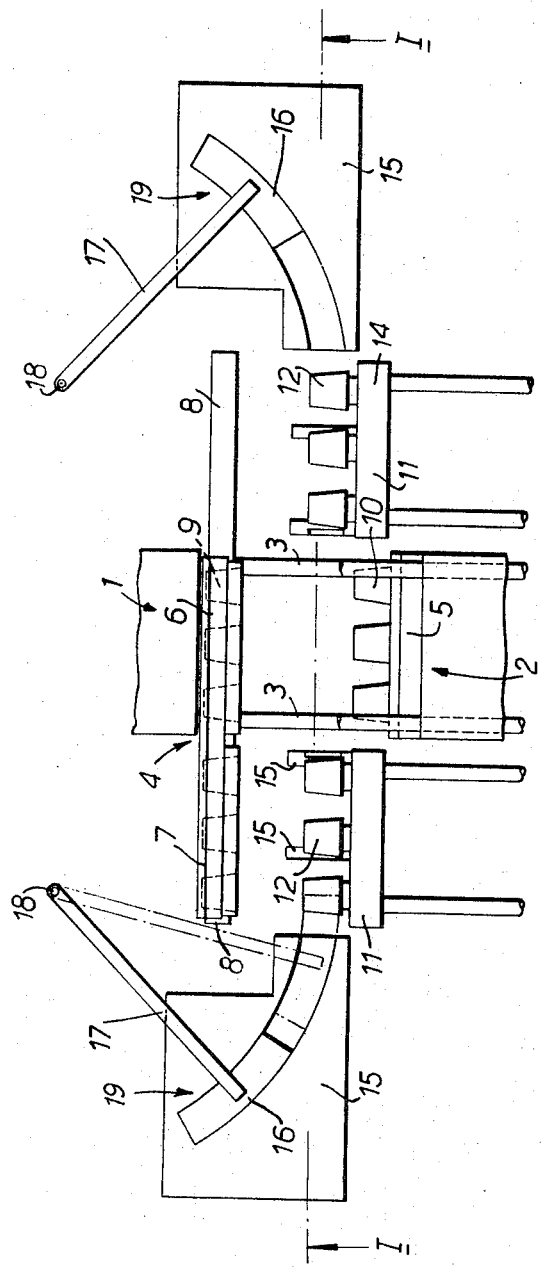
FIG. 2 is a plan view of part of the moulding machine of FIG. 1.
Figure 3:
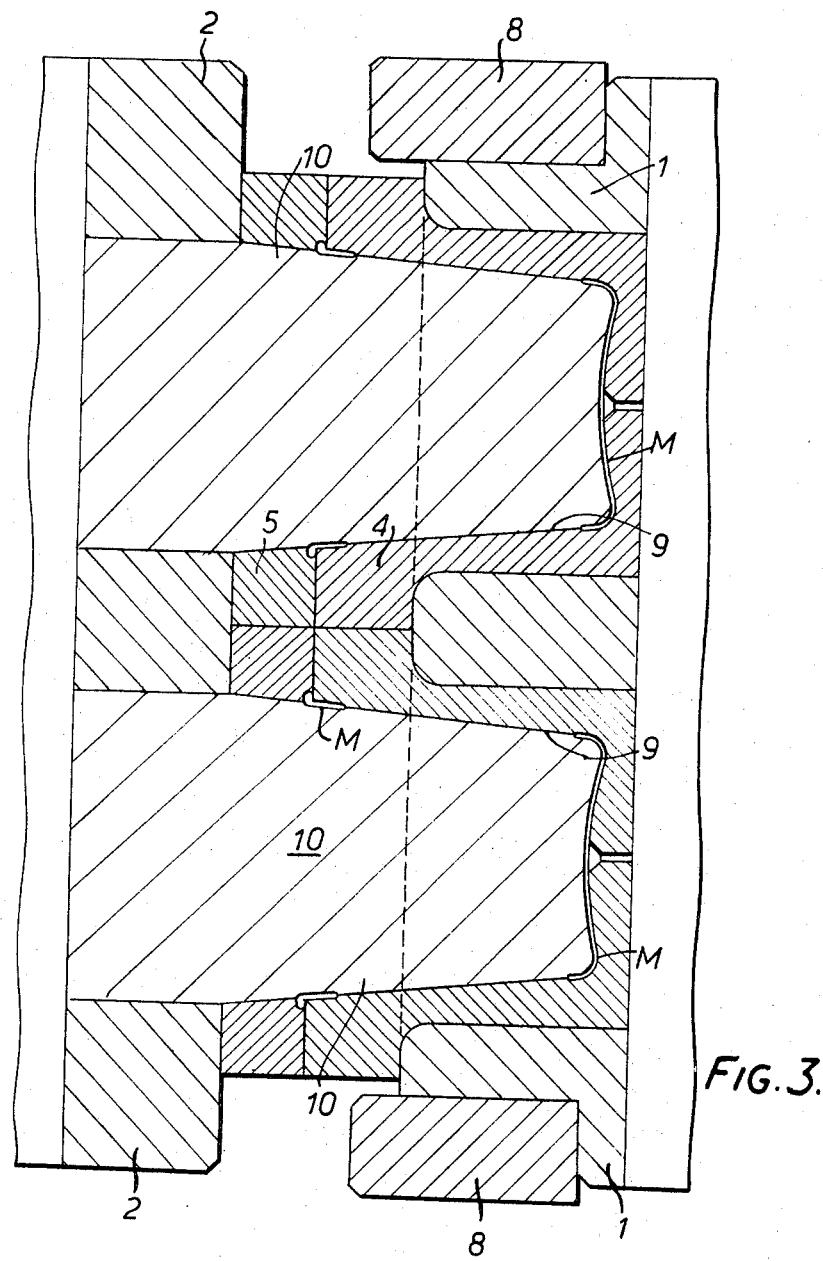
FIG. 3 is a diagrammatic section through a mould tool, mould tool carrier and guide means therefor.
Figure 4:
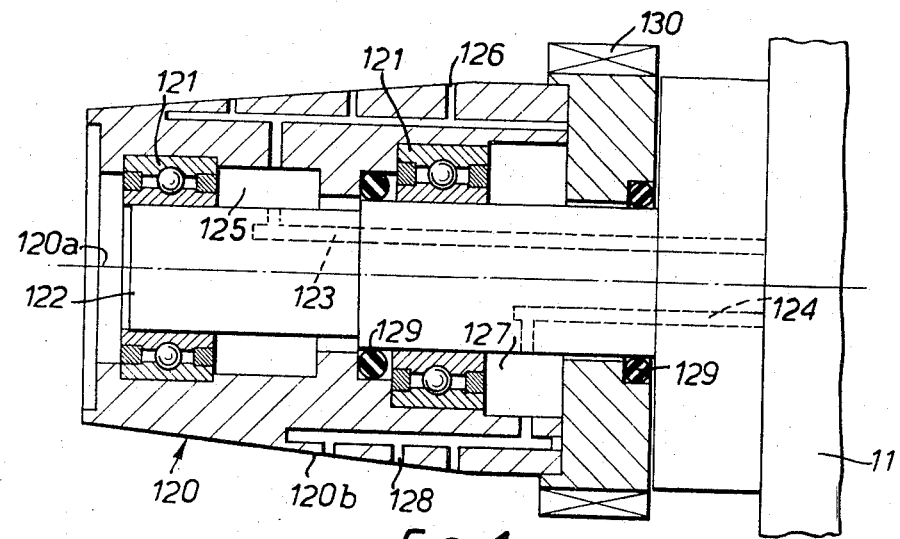
FIG. 4 is a cross section through a foil carrier.
Figure 5:
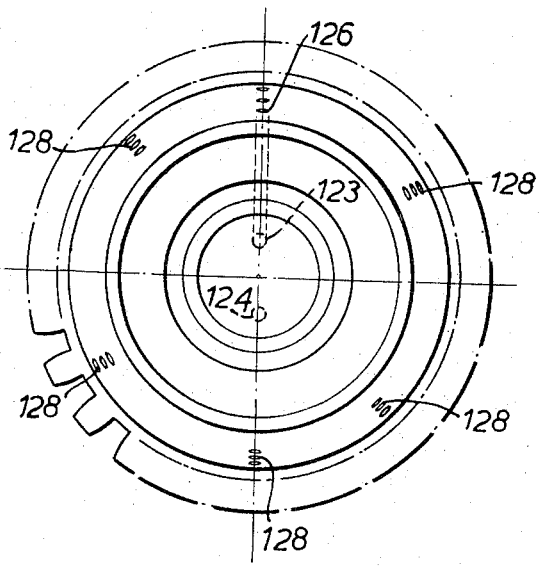
FIG. 5 is an end elevation of the foil carrier of FIG. 4.

The injection moulding machine includes a fixed tool carrier 1 and a movable tool carrier 2 guided by guide bars 3 between an open position (FIG. 2) and a closed moulding position in which mould tools 4, 5 together define the mould cavities M which will in number equal the impressions to be made upon each mould cycle.

Figure 1:
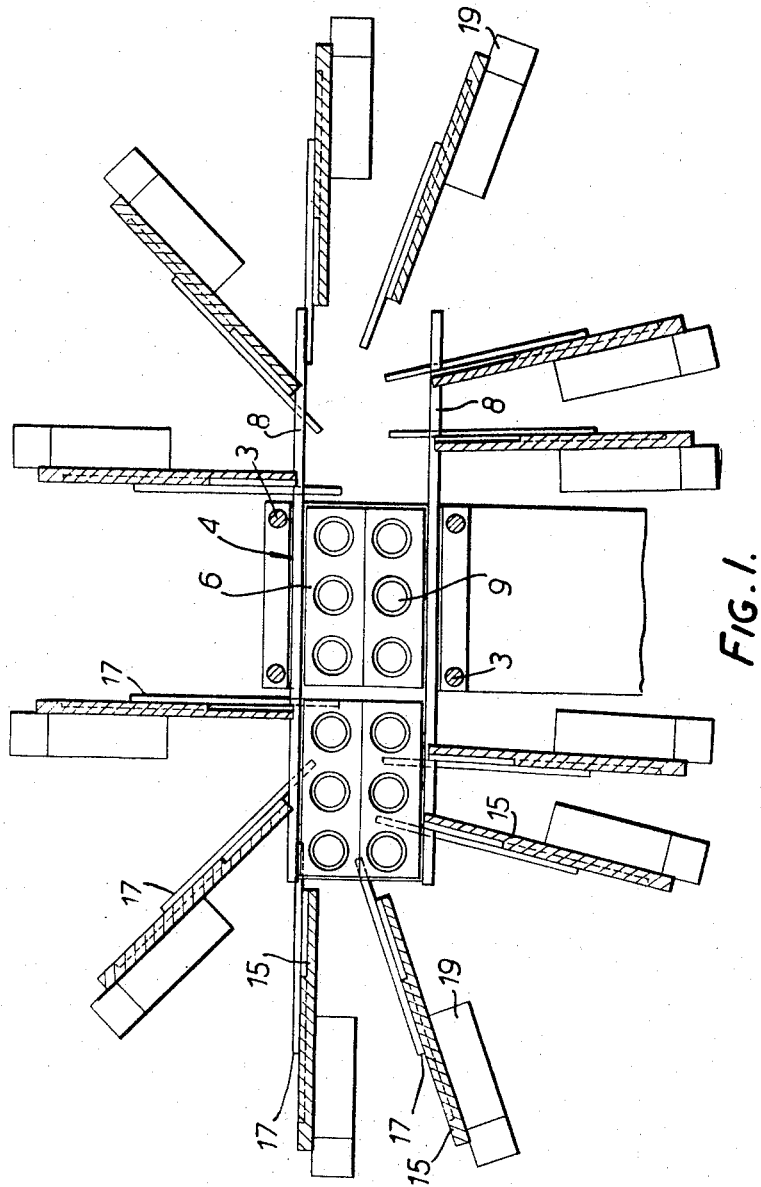
FIG. 1 is a front elevation of a mould cavity tool in an injection moulding machine and diagrammatically shows foil dispensing and transfer means, taken on the line I—I of FIG. 2.

The tool 4 is a double tool movable transversely of the direction of movement of carrier 2 and having parts 6, 7 each of which with the tool 5 will define a set of mould cavities. When one part 6 is in a moulding position (as shown in FIG. 1) against fixed tool carrier 1, the other, 7, is in an external position outside the path of movement of that carrier 1 and tool 5. To guide the double tool 4 in its transverse movement there are provided guide rails 8.

Tool 4 is shown as a six impression tool and designed for making tapering thin walled containers such as described in U.K. Pat. No. 1,348,370, each part 6, 7 of the tool 4 defining six cavities 9 and the tool 5 six cores 10.

The foil transfer device comprises a pair of carriages 11 mounted on each of which are six foil carriers 12. Each foil carrier 12 comprises a body 120 having an axis of symmetry 120a about which it is rotatable and defining a circumferential surface 120b for receiving a foil. In the present embodiment the body 120 is generally frusto-conical corresponding to the shape of a cavity 9 and the container to be made therein. Each of the carriers 12 is coaxial with a cavity 9 of one part 6 or 7 of tool 4 when in the external position relative to the path of tool 5. Each carrier body 120 is rotatable about its axis on sealed bearing races 121 carried by a support 122 having passages 123, 124 coupled to a vacuum source, not shown. Passage 123 is coupled to a manifold 125 and thence to a first set of ports 126 in the carrier body surface 120b, while passage 124 is coupled to a manifold 127 in turn coupled to a plurality of second sets of ports 128 in the carrier body surface 120b. O-rings 129 seal the manifolds. A drive such as a motor 14 is mounted on each carriage and is coupled to the carriers on that carriage by a gear train (not shown) for which purpose each carrier has teeth 130. Other forms of drive such as a chain or rack and pinion could be used.

In a plane tangential to the surface of each carrier is the surface of a guide element 15 on which slides a vacuum plate 16, coupled to the vacuum source and movable by an arm 17 pivoted at 18 on a support structure. A drive to the arm of any convenient kind is operable to swing the plate 16 from a position over a foil magazine 19 to a position in which the leading edge of a foil held by the plate 16 lies over ports 126 of the associated carrier. Application of vacuum at the ports 126, if necessary use of jets of air directed on to the leading edge of the foil and release of vacuum at the plate causea a foil carried by the plate to be attached to the carrier. Rotation of the carrier and application of vacuum to the ports 128 will then wrap the foil around, and hold it on to, the carrier. Advance of the respective carriage 11 in the direction of the carrier axes will move the carriers into the axially aligned idle cavities 9 and release of vacuum at the ports 126, 128 will release the foils from the carriers, each foil springing open under its own resilience off the respective carrier and on to the internal surface of the respective cavity. The carriage is then retracted. The loading, advance, unloading and retraction of the carriage and carriers occurs while the moulding cycle is effected. Upon completion of that cycle, tool 5 is retracted and the tool 4 is moved transversely to displace the empty cavities to their external position out of the path of the movable tool 5 for loading with foils and the loaded cavities into moulding position in the path of tool 5 for a moulding cycle. Drive to the carriages and to the tools may be by piston/cylinder assemblies or rack and pinion drives.

Figure 6:
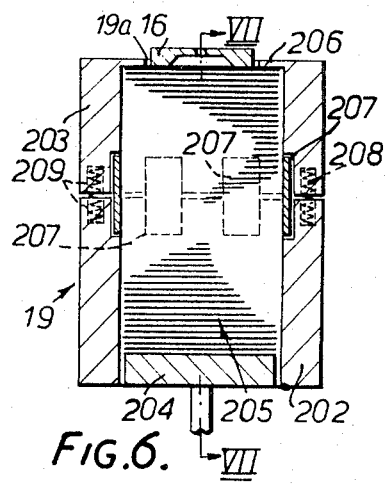
FIG. 6 is a section through a magazine for foils for use in the machine of FIGS. 1 and 2.
Figure 7:
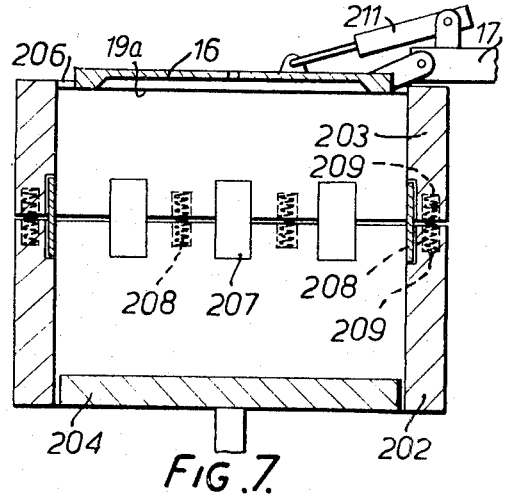
FIG. 7 is a section on the line VII—VII of FIG. 6.

Each magazine 19 is preferably particularly adapted to ensure that a single foil only is picked up by the respective plate 16. As shown in FIGS. 6 and 7, each magazine 19 comprises a lower fixed portion 202, an upper portion 203, telescopically movable relative to portion 202, and a foil back-up member 204. The member 204 is movable by a piston and cylinder arrangement (not shown) within the magazine 19 to hold and bias a stack of foils 205 in the magazine against foil edge retaining lips 206 carried on the magazine portion 203.

The upper magazine portion 203 is guided in its movement relative to portion 202 by fingers 207 fixed in recesses in the portion 202 and extending into recesses in the portion 203. These fingers 207 also prevent foils in the magazine from moving into the gap between the two magazine portions 202, 203. The magazine portion 203 is biased for movement away from portion 202 by springs 208 located in bores 209 in the portions and is moved towards the portion 202 into abutting relation therewith by piston and cylinder means (not shown).

Foils are removed individually from the magazine by the vacuum plate 16. The plate 16 is movable about pivot 18 from a foil receiving station above the magazine to adjacent the foil carrier by a piston and cylinder arrangement (not shown) acting on arm 17 and, at the foil receiving station to and from a foil pick-up position, as shown in the Figures, by a piston and cylinder arrangement all. The plate 16 is pivotally mounted on arm 17 and the piston and cylinder 211 is mounted between plate 16 and arm 17 for relative pivotal movement.

In operation, with the plate 16 in the foil receiving station, the magazine portion 203 held in its abutting position relative to portion 202 by its piston and cylinder and the foils biased by back-up member 204 against the lips 206, the piston and cylinder 211 is operated to pivot the plate 16 down into the foil pick-up position. Suction is applied to the plate which thereby engages the uppermost foil in the magazine, FIG. 6. Thereafter, the upper portion 203 of the magazine is moved upwards, under the bias of the springs 208, so that the foils in the magazine are released from the compressive force exerted on them by the lips 206.

Finally, as the plate 16 is pivoted back to its original position by the piston and cylinder arrangement 211, the upper magazine portion 203 is moved by its piston and cylinder means (not shown), against the bias of springs 208, back into abutting relation with the portion 202.

During these final two movements, the foil engaged by the plate 16 is drawn past the lips 206 and in being so drawn is slightly bowed downwardly by the presence of the lips. This bowing causes any additional foil carried therewith to break free of the engaged foil so that such a foil is retained in the magazine by the lips 206. This bowing is effective because of the removal of the compressive force on the stack of foils by the upward movement of the magazine portion 203.

Thereafter the plate 16 and foil are moved to the respective foil carrier at which vacuum is removed from the plate 16 to allow the sheet to be disengaged therefrom.

Although the above described magazine and vacuum plate are controlled by cylinders and pistons to which compressed air or other fluid is supplied, the control may alternatively be electric.

In the above described apparatus the magazine 19 is shown and described as being vertically orientated; the magazine for the various foil carriers may have a varying inclination to the vertical as shown in FIG. 1.

Any suitable controls may be used to ensure the proper sequence and distance of movements and of application and release of vacuum and operation of air jets if provided.

The configuration of the carrier body may be varied as required in dependence on the shape of the mould cavity and the article to be produced therein. For example, the carrier body may have a cross-section transverse to its axis which is bounded by a curvilinear periphery, e.g., it may be cylindrical or frusto-conical, as above described, or may have an oval cross-section. Alternatively the carrier body may have a polygonal or part rectilinear, part arcuate cross-section, as desired.

Figure 8:
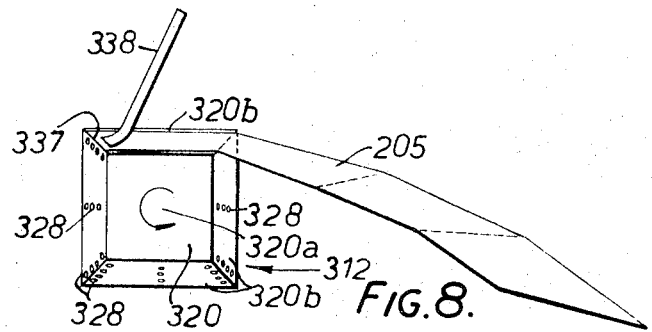
FIG. 8 is an end view of a second embodiment of foil carrier for use in the machine of FIGS. 1 and 2.
Figure 9:
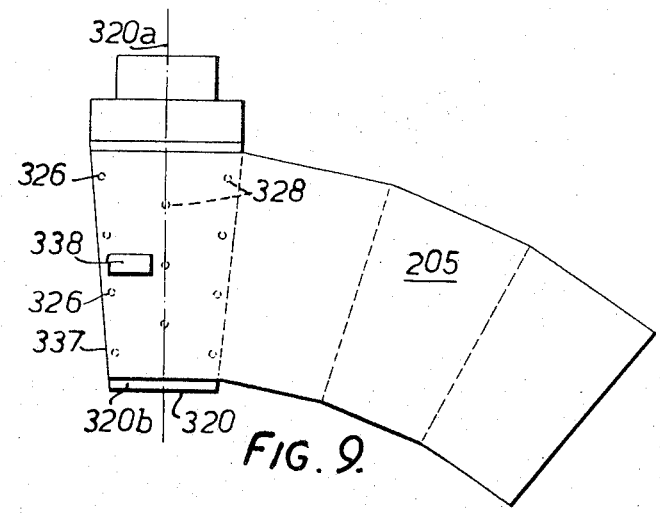
FIG. 9 is a plan view of the foil carrier of FIG. 8.

A tapering square section carrier is shown in FIGS. 8 and 9 for use with correspondingly shaped mould tools. Carriers 312 replace the carriers 12 of the above-described embodiment with corresponding replacement of the tools 4, 5.

The carrier 312 includes a body 320 having a generally square section and is rotatable about its axis of symmetry 320a in a manner similar to the above described carrier 12. The circumferential surface 320b of the carrier is provided with a plurality of ports 326, 328 connected to a source of vacuum.

As in the above-described embodiment a foil 205 is fed tangentially in the direction of the arrow A to that planar portion of surface 320b of the carrier body provided with ports 326. When the foil is positioned by the vacuum plate 16 over the ports 326, with its leading edge immediately above the furthest corner 337 of the surface portion, the vacuum on the plate 16 is released, the vacuum source is connected to the ports 326 and 328 successively and the carrier rotated so that the foil is drawn down and held on to the surface of the carrier as in the above-described embodiment.

Thereafter as described in the above embodiment the carrier is moved axially into a cavity having corresponding dimensions.

To assist and ensure correct wrapping of the foil around the carrier body surface, one or more leaf springs 338 may be provided above the uppermost surface portion of the carrier body and biased into contact with that surface portion. In operation, the leaf spring 338 is moved from its operative position by the vacuum plate 16 as it brings a foil to the carrier but moves back into position on withdrawal thereof. It is also moved out of the path of the carrier when the carrier moves axially into the cavity.

In a modification the leaf spring 338 may be replaced by a freely rotatable roller spring biased down on to the surface of the carrier body.

The apparatus is capable of high production rate due to the low downtime and may be used to produce products having a decorative and/or informative foil ancilliary to the structure of the product or it may be used to make products in which the foil itself constitutes a structural part of the product such as a peripheral wall portion of a receptacle. Such a receptacle and a method of making such a receptacle are the subject of U.K. Pat. No. 1,348,370.

In addition to using the carriers to apply foil to the peripheral wall of a cavity they may be used to carry a foil on the end thereof, applied thereto by another carrier or by a second swinging arm and vacuum plate. In that case means may be required to blow the foil off the carrier into the cavity and it may be desirable to apply a static charge to the foil to hold it in the cavity.

Whilst a machine has been described in which the fixed tool is changed between each moulding cycle for loading purposes, it is also possible to change that tool which is normally the moving tool.

Although as described a foil is fed to a foil carrier from a magazine by a suction plate, the machine may be modified so that each magazine is located relative to its carrier to position the next foil to be withdrawn tangentially of the surface of the carrier, application of vacuum to the carrier ports causing that foil to be picked up by the carrier and rotation of the carrier causing the foil to be withdrawn from the magazine and simultaneously wrapped round the carrier.

The term foil as used herein is intended to mean a piece of any flexible sheet material, as for example, synthetic plastics or metal foil, paper, board or any flexible laminated or coated sheet material whether pervious or impervious to fluids. The material may be plain or printed and of variable opacity as required.

I claim:

1. The combinations of a moulding machine and a mechanism for feeding a foil to the moulding machine, the moulding machine comprising:
   a. first and second mould tools;
   b. means for moving said mould tools relative to each other in a moulding station to and from a moulding position in which said mould tools co-operate to define a mould cavity; and
   c. means for moving said first mould tool laterally out of said moulding station; the mechanism comprising:
   a. a carriage movable between first and second stations;
   b. drive means for moving the carriage between said first and second stations;
   c. a foil carrier comprising a body having an axis of symmetry and defining a circumferential surface for receiving a foil, port means in the circumferential surface and means for connecting said port means to a source of fluid at subatmospheric pressure;
   d. means mounting said carrier on the carriage for rotation about said axis of symmetry;
   e. drive means for rotating said carrier;
   f. positioning means for positioning a foil tangentially of said circumferential surface of said carrier when said carriage is in said first station; and
   g. control means for connecting said source of fluid at subatmospheric pressure to said ports and for causing said carrier drive means to be energised to rotate said carrier to cause a foil positioned by said positioning means tangentially of said carrier surface to be progressively applied to said surface when said carriage is in said first station, and for disconnecting said source of fluid from said ports when said carriage is in said second station and wherein the mechanism is mounted on said moulding machine such that the direction of movement of said carriage between said first and second stations is generally parallel to said direction of movement of said mould tools in said moulding station and said means for moving said first mould tool laterally of the said moulding station is adapted to move said first mould tool into said second station of said carriage.

2. The combination as claimed in claim 1 wherein said first mould tool includes a female mould and said second mould tool includes a male mould, said carrier being arranged such that when said carriage is in said second station said body of said carrier is within said female mould.

3. The combination as claimed in claim 2, wherein the shape of said carrier body conforms to the shape of said female mould.

4. A machine as claimed in claim 1 wherein the mechanism includes a plurality of carriers and said first and second mould tools co-operate to define an equal number of mould cavities.

5. The combination of a moulding machine and a mechanism for feeding a foil to the moulding machine, the moulding machine comprising:
   a. first and second mould tools;
   b. means for moving said mould tools relative to each other in a moulding station to and from a moulding position in which said mould tools co-operate to define a mould cavity; and
   c. means for moving said first mould tool laterally out of said moulding station and into a foil release station, and vice versa; the mechanism comprising:
   a. a foil carrier comprising a body having an axis of symmetry and defining a circumferential surface for receiving a foil, port means in the circumferential surface and means for connecting said port means to source of fluid at subatmospheric pressure;
   b. means for moving said carrier between a foil feed station and the foil release station of said first mould tool, said means being operable to move said carrier along its axis of symmetry to said foil release station in a direction generally parallel to the direction of movement of said mould tools in said moulding station;
   c. means for positioning a foil tangentially of said circumferential surface of said carrier when said carrier is in said foil feed station;
   d. means for progressively applying a foil to said circumferential surface when the carrier is in the foil feed station; and
   e. control means for connecting said source of fluid at subatmospheric pressure to said ports and for causing said foil applying means to be energised to cause a foil positioned by said positioning means tangentially of said carrier surface to be progressively applied about said surface when said carrier is in said foil feed station, and for disconnecting said source of fluid from said ports when said carrier is in said foil release station.

6. The combination according to claim 5 in which said foil applying means comprise means mounting the carrier for rotation about its axis of symmetry and said positioning means comprise means for offering one end of the foil tangentially to the carrier.

7. The combination according to claim 5 in which the said first mould tool includes a female mould, said second tool includes a male mould, and the carrier is positioned in the female mould when in the foil release station.

8. The combination according to claim 7 wherein the shape of said carrier body conforms to the shape of said female mould.

9. The combination according to claim 5 wherein the mechanism includes a plurality of carriers and said first and second mould tools co-operate to define an equal number of mould cavities.

10. The combination according to claim 5 including another first mould tool, each of said first mould tools being a cavity tool, and a respective carrier co-operating with each of said cavity tools.

* * * * *